Oct. 9, 1923.

O. E. WILSON

WHEEL

Filed March 7, 1921

O. E. Wilson INVENTOR

BY Victor J. Evans
ATTORNEY

Oct. 9, 1923.  1,470,517
O. E. WILSON
WHEEL
Filed March 7, 1921   2 Sheets-Sheet 2
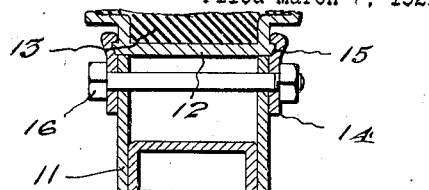
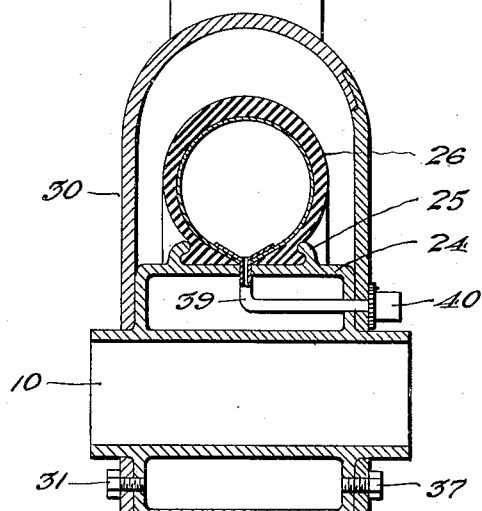
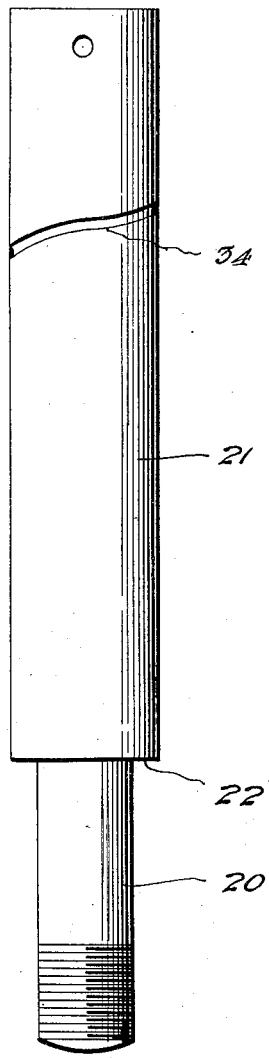
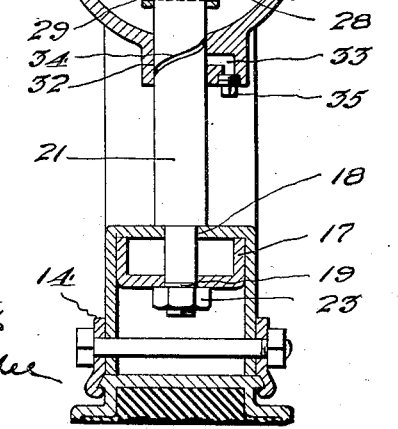
O. E. Wilson
INVENTOR
BY Victor J. Evans
ATTORNEY Patented Oct. 9, 1923.

1,470,517

UNITED STATES PATENT OFFICE.

OTTO EVERETT WILSON, OF PERU, INDIANA.

WHEEL.

Application filed March 7, 1921. Serial No. 450,211.

*To all whom it may concern:*

Be it known that I, OTTO E. WILSON, a citizen of the United States, residing at Peru, in the county of Miami and State of Indiana, have invented new and useful Improvements in Wheels, of which the following is a specification.

This invention relates to resilient wheels and has for an object the provision of a wheel of this character in which a cushioning member in the form of a pneumatic tire is employed, the latter being arranged so as not to engage the ground, whereby wear and puncture will be avoided, at the same time the full cushioning effect of the tire will be utilized.

In carrying out the above, the invention contemplates the provision of a wheel of novel structure in which the cushioning member or pneumatic tire is protected within a housing, the said pneumatic member being carried by an extension of the wheel hub, which also serves as attaching means for the protecting housing, while the latter provides means for guiding a plurality of radially movable spokes whose inner ends bear against the pneumatic member.

The invention further includes the following novel features and details of construction, to be hereinafter more fully described, illustrated in the accompanying drawings and pointed out in the appended claim.

In the drawings:—

Figure 2 is an enlarged sectional view on the line 2—2 of Figure 1.

Figure 4 is an elevation of one of the radially movable spokes.

Figure 5 is a detail of the lug for gripping the rim.

Figure 1:
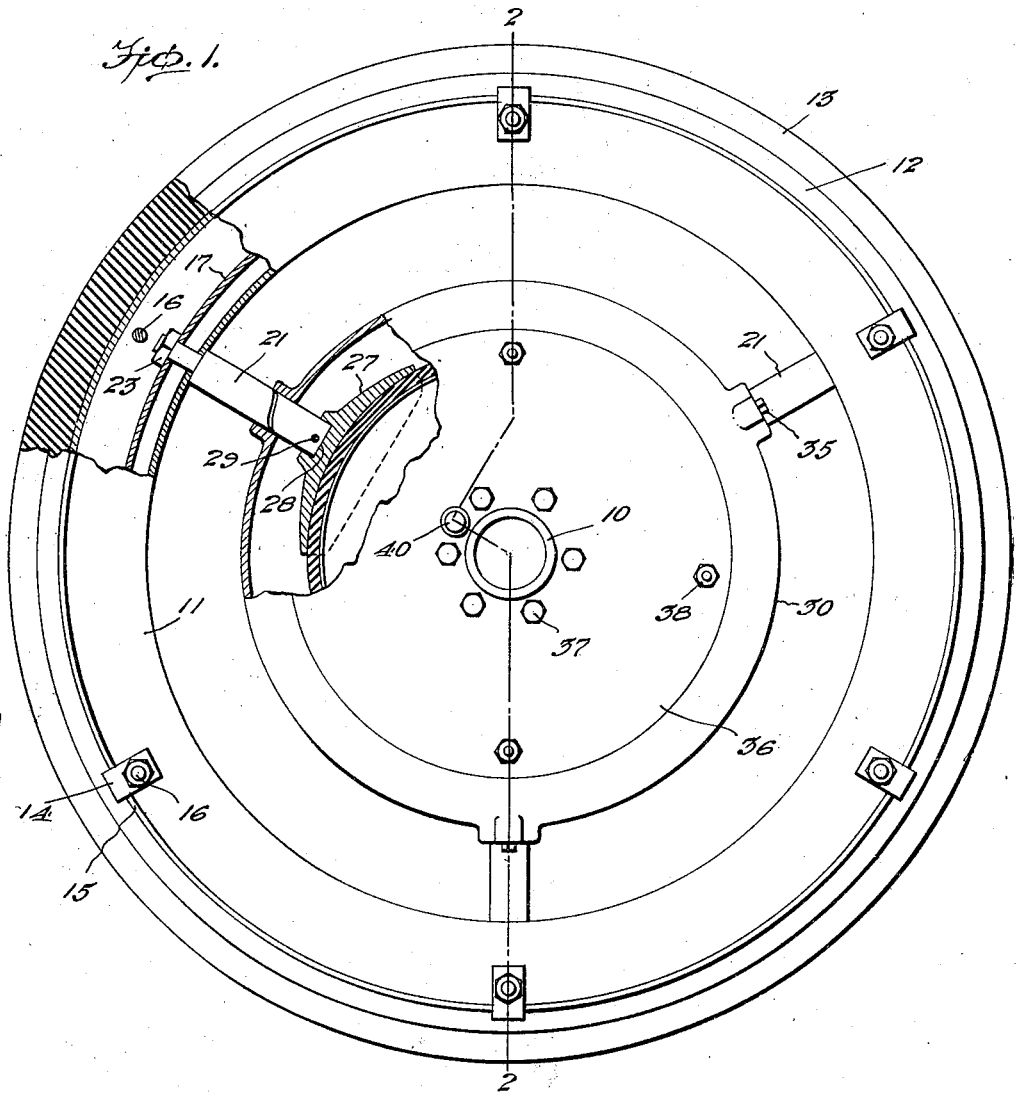
Figure 1 is a side elevation of a wheel embodying the present invention, parts being broken away to more clearly illustrate the construction.
Figure 3:
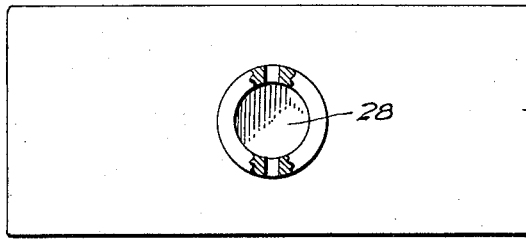
Figure 3 is a fragmentary elevation of one of the segmental spoke shoes.

Referring to the drawings in detail, wherein like characters of reference denote corresponding parts, the invention as illustrated comprises a hub 10 and a felly 11, the latter being provided with a suitable rim 12 which may be permanently secured to the felly, or detachable as shown. This rim has secured thereto a tire 13, which is preferably solid, but it is of course obvious that a pneumatic tire may be employed if desired. The rim 12 is detachably secured to the felly of the wheel by means of rim lugs 14 which engage over annular flanges 15 carried by the rim 12.

The felly 11 is preferably channel-shaped in cross section and the rim lugs are held in position by means of a bolt 16 which passes through openings provided in each side of the channel-shaped felly. Located within this felly is an annular member 17 which is also channel-shaped in cross section, the open edge of the channel being arranged opposite to that of the felly. Extending through registering openings 18 and 19 provided in the felly 11 and the annular member 17 respectively, is the reduced threaded end 20 of a spoke 21, as shoulder 22 formed on the spoke engaging the inner periphery of the felly 11, while the outer periphery of the annular member 17 is engaged by a nut 23 upon the threaded extension of the spoke. The said spoke is thus rigidly held connected to the felly. Any number of these spokes may be employed, but it is believed that only three will be necessary.

Extending from the hub 10 is an annular extension 24, whose cross sectional width is less than the length of the hub. This extension has projecting from its outer periphery spaced annular flanges 25 for engagement with the beads of a pneumatic tire casing 26 of the clincher type.

Secured to the inner ends of each of the spokes 21 is a segmental shoe 27 which is provided in one face with a socket 28 for the reception of the end of the spoke, the latter being secured within this socket by means of a pin 29. The opposite face of the shoe 27 is shaped to conform to the tread of the tire 26 with which it contacts, so that when the said tire is inflated relative movement of the felly and hub will be resisted and a cushioning effect will result.

In addition to providing means for securing the cushioning member 26 in position, the annular extension 24 also provides means for attaching to the hub a casing 30 which is adapted to surround and protect the outer or cushioning member, being bolted to the extension as shown at 31. This casing is provided with spaced guides 32 for the passage of the spokes 21, so that in addition to affording a protection for the tire 26, the said casing also acts to guide the spoke in its radial movement. The guides 32 for the spokes are provided with a lubricant containing chamber 33, while the spokes 21 have formed in their peripheries lubricant grooves 34 which receive a lubricant from the chambers 33 to prevent friction between the spokes and their guides. The lubricant chambers 33 are provided with closure plugs 35, whereby a supply of lubricant may be introduced. The casing 30 is open at one side and this opening may be closed by a plate 36 which is bolted to the annular extension 24 and to the casing proper as shown at 37 and 38 respectively. A tube 39 extending from the tire 36 to the outside of the casing provides means whereby air may be introduced to the tire 26, the outer end of the tube being preferably provided with a cap 40 for protecting the same. It will be seen by reference to Figure 2 of the drawings that the rim 12 which carries the outer tire 13 extends laterally beyond the sides of the felly and also beyond the ends of the bolts 16 for the protection of the latter.

The invention is susceptible of various changes in its form, proportions and minor details of construction and the right is herein reserved to make such changes as properly fall within the scope of the appended claim.

Having described the invention what is claimed is:—

A resilient wheel of the character described comprising a hub, a hollow annular extension channel shaped in cross section surrounding the hub, spaced annular associated flanges projecting from one wall of the extension, a pneumatic tire carrying in the flanges a metallic casing surrounding the tire and having its side walls secured to the side walls of the extension, one side wall of the casing being detachable, a right angled bent conveying tube partially arranged between walls of the extension and having one end communicating with the tire and its opposite end passing through one side wall of the extension and the detachable wall of the casing respectively, annularly spaced guides formed in the casing, spokes provided with lubricating grooves passing through the guides, lubricating cups formed on the guides and adapted to communicate with the grooves, a channel shaped member secured to the felly of the wheel, said spokes having reduced outer ends secured to the channel shaped member and a shoe carried by the inner end of the spokes and being designed to engage the tire as and for the purpose specified.

In testimony whereof I affix my signature.

OTTO EVERETT WILSON.